April 26, 1960 K. LAUTERBACH 2,934,056

CLAY PIGEON THROWING MECHANISM

Filed Sept. 4, 1956 7 Sheets-Sheet 1

April 26, 1960 K. LAUTERBACH 2,934,056

CLAY PIGEON THROWING MECHANISM

Filed Sept. 4, 1956 7 Sheets-Sheet 2

April 26, 1960 K. LAUTERBACH 2,934,056

CLAY PIGEON THROWING MECHANISM

Filed Sept. 4, 1956 7 Sheets-Sheet 5

April 26, 1960 K. LAUTERBACH 2,934,056

CLAY PIGEON THROWING MECHANISM

Filed Sept. 4, 1956

7 Sheets-Sheet 6

United States Patent Office 2,934,056

Patented Apr. 26, 1960

2,934,056

CLAY PIGEON THROWING MECHANISM

Karges Lauterbach, Rochester, N.Y.

Application September 4, 1956, Serial No. 607,612

10 Claims. (Cl. 124—9)

This invention relates to mechanism for throwing clay pigeons or similar articles to be used as targets for shooting.

An object of the invention is the provision of generally improved and more satisfactory throwing mechanism of this kind.

Another object is the provision of automatic throwing mechanism so designed that the trajectory or path of flight of the article being thrown is varied from one throw to another in an irregular and unpredictable manner.

Still another object is the provision of throwing mechanism sufficiently powerful to throw the target through a long trajectory, yet sufficiently gentle in its action on the target so that there is little danger of breaking the target even if the target happens to be chipped or otherwise imperfect.

A further object is the provision of throwing mechanism of relatively simple and inexpensive character, yet capable of being loaded with a relatively large supply of targets, the machine thereafter serving, without further manual attention, to throw the targets one at a time, each time that the machine is tripped or triggered, until the supply is exhausted.

These and other desirable objects may be attained in the manner disclosed as an illustrative embodiment of the invention in the following description and in the accompanying drawings forming a part hereof, in which.

Figures 9, 10, 11, 12:
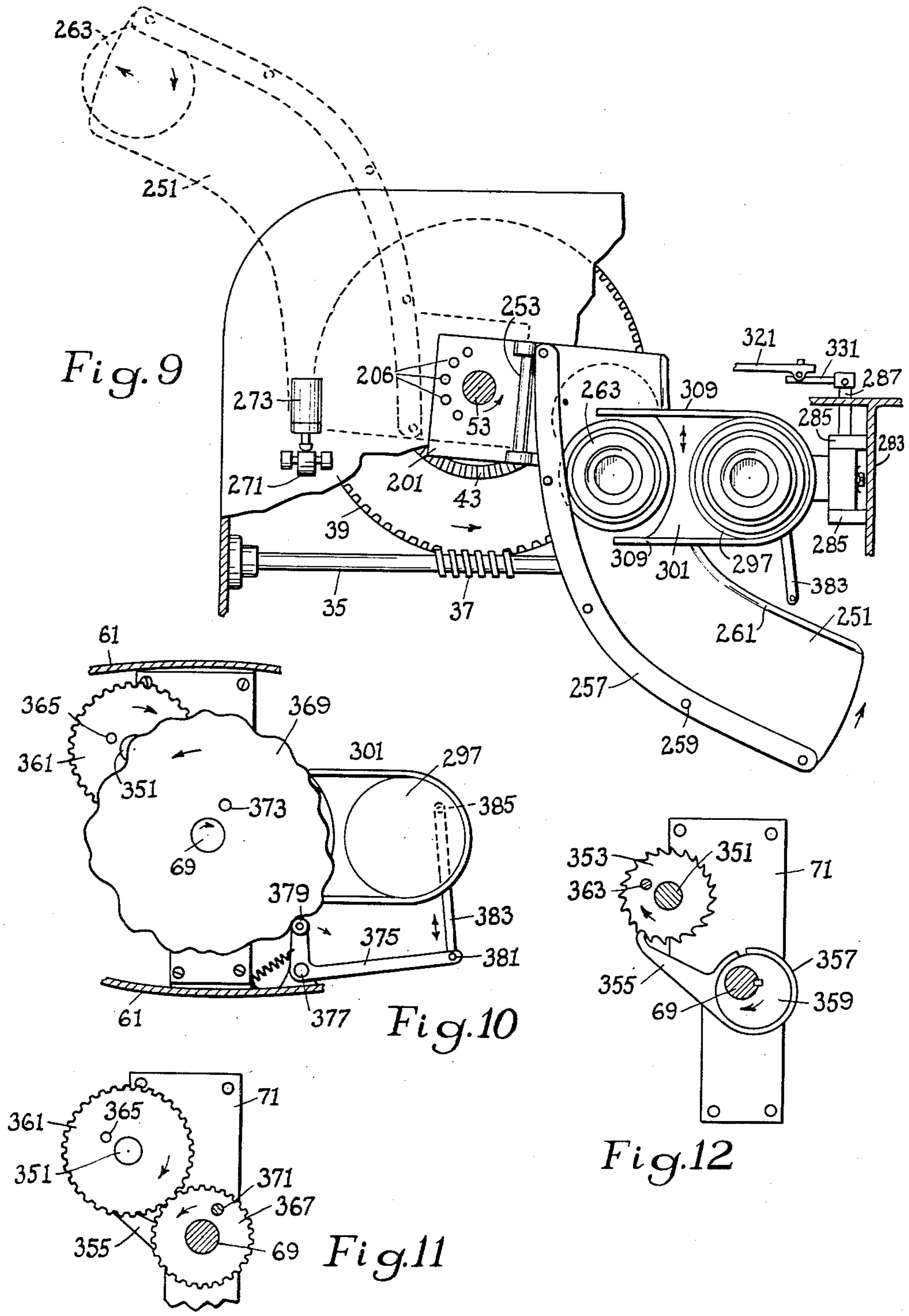
Fig. 9 is a view partly in plan and partly in horizontal section of the target throwing arm, the target delivering chute, and associated driving mechanism, showing the throwing arm in target receiving position in full lines, and in target throwing position in dotted lnes.
Figures 13, 14:
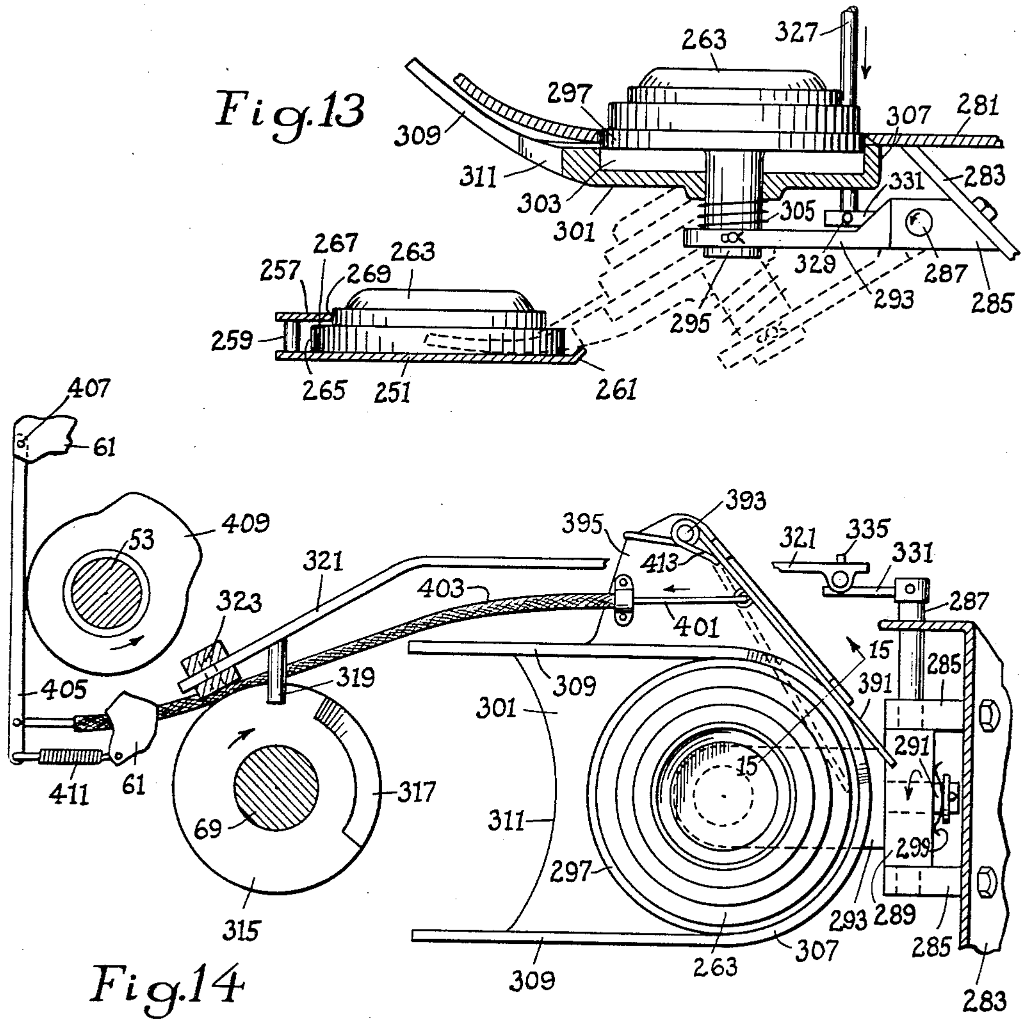
Figure 15:
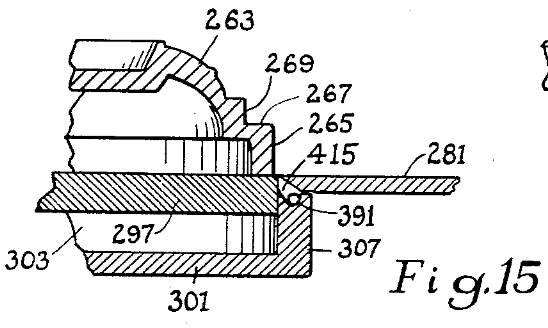
Figure 16:
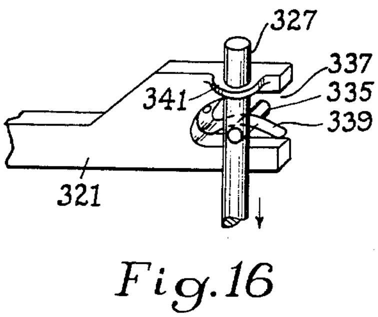
Figure 17:
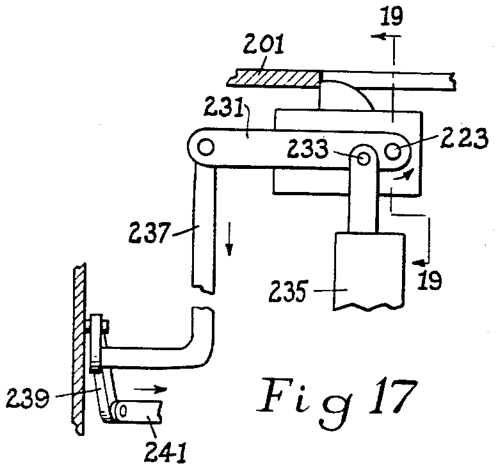
Figure 18:
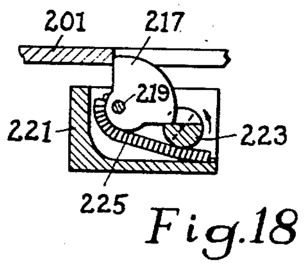
Figure 19:
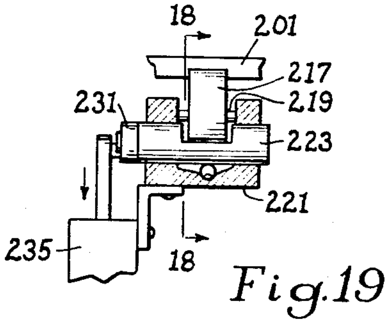

Fg. 10 is a view partly in plan and partly in horizontal section, of the cam and associated controlling means for changing the position of the target delivery chute with relation to the target throwing arm, so as to vary the trajectory of the thrown target in an unpredictable manner;

Figure 11 is a detail of certain of the gears for driving the chute controlling cam;

Fig. 12 is a detail of the pawl and ratchet mechanism for driving the chute controlling cam;

Fig. 13 is a detail on a larger scale, partly in vertical section and partly in plan, showing in full lines the target delivery chute in normal position for receiving a target from the stack or pile of targets, and in dotted lines the dropped or depressed position of the chute when delivering a target to the throwing arm;

Fig. 14 is a diagrammatic view, mainly in plan and partly in horizontal section, illustrating the mechanism for dropping or depressing the chute and also the mechanism for disloding a target so that it slides down the chute;

Fig. 15 is a vertical section on a still larger scale, taken approximately on the line 15—15 of Fig. 14;

Fig. 16 is a perspective view on a larger scale of a connection between two parts of the mechanism for depressing the target delivery chute;

Fig. 17 is a detail of the latch for holding the throwing arm in tensioned position;

Fig. 18 is a section through the latch, taken substantially on the line 18—18 of Fig. 19;

Fig. 19 is a section taken substantially on the line 19—19 of Fig. 17; and

Figure 20:
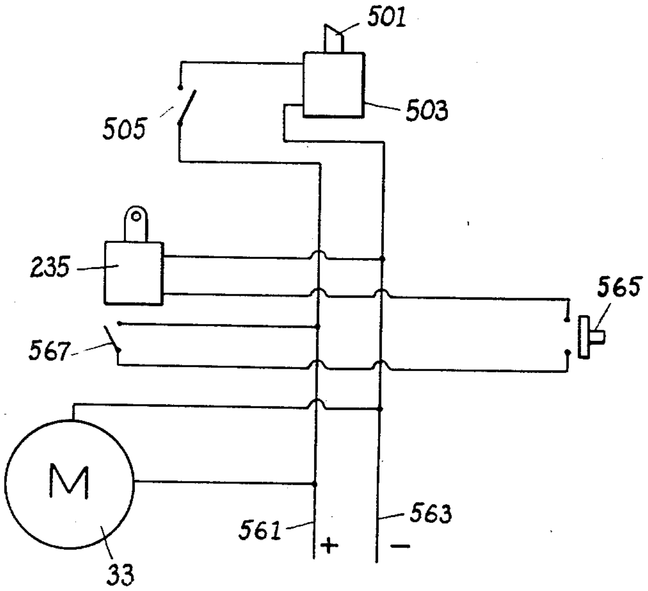

Fig. 20 is a diagram of the electrical circuit of the machine;

The same reference numerals throughout the several views indicate the same parts.

Referring now to the drawings, the various parts of the machine will be described in groups under appropriate headings.

*General organization*

To give first a general outline of the principal parts of the entire machine, there is means, preferably in the form of a roller conveyor, for holding a large supply of the targets to be thrown by the machine. These targets are preferably of the familiar kind commonly known as clay pigeons, widely used as targets for practice shooting and in shooting matches, but will hereafter usually be referred to simply as targets, for the sake of brevity.

On the holding means or conveyor, the targets are stacked to a considerable height, one on top of another, the exact height to which they are stacked not being critical, as the machine is capable of feeding targets satisfactorily either from low stacks containing only a few targets, or from relatively high stacks containing many targets.

The main area of the conveyor holds many rows of targets, each row containing several stacks, and each stack containing many targets. In the final or delivery row, the stacks are placed so that the end stack of the final row is in feeding position, and when all of the targets from this stack have been fed to the throwing mechanism and thrown from the machine, the next stack of the same final row is moved to feeding position. When all of the stacks of the final row have been fed to feeding position, the remaining rows on the conveyor are advanced through the space of one row, to bring a fresh row into the final row position.

A curved throwing arm rotates approximately horizontally about an approximately vertical but slightly inclined axis, and a motor winds up or tensions a throwing spring while the throwing arm is held stationary in predetermined position, by latch mechanism. While the throwing arm is in this stationary latched position, a movable chute delivers one target from the bottom of the last or final stack of targets, onto the throwing arm. Cam mechanism varies the position of the delivery chute with respect to the throwing arm, so that at one operation the chute delivers the target to one point on the throwing arm, at another operation the target is delivered to a slightly different point on the throwing arm, and so on, the cam producing many different variations of position so that the position of the target delivered to the throwing arm, and consequently the trajectory or path of travel of the target when thrown by the arm, is varied in an irregular and completely unpredictable manner. No matter how much experience a given sportsman may have had with this particular throwing machine, he can never predict with any reasonable accuracy the exact trajectory of the target at the next throw. Moreover, the control cam is readily interchangeable or replaceable with a fresh one, with different control surface, so that a completely new and unknown cam may be used at shooting contests or meets.

When the latch or trip which holds the throwing arm is released, the previously wound spring causes the throwing arm to swing rapidly in a manner to throw the target from the throwing arm with high velocity, by centrifugal force. The target is always thrown in the same general direction, but the previously placing of the target in various different and unpredictable positions on the throwing arm results in unpredictable variations in the exact trajectory, even though the trajectory is always in the same general sector or direction.

The throwing arm makes one complete revolution, is caught and stopped again by the latch mechanism, and the motor mechanism winds the spring tight ready for the next throw. The target delivery mechanism delivers the bottom target of the last or final stack of targets onto the delivery chute and thence to the throwing arm, and the mechanism is then ready for another throwing operation when the latch is tripped or released by pressing a button or other suitable manipulation.

Since the machine is controlled electrically, it may be tripped or released from a remote point. And since the machine will hold a very large supply of targets, sufficient for an average day's shooting, it follows that the machine can be readied for operation in the morning, by loading the supply of targets, and thereafter no further attention is required all day. The sportsman himself, or a companion of his, can operate the trip or release mechanism from the firing line, no attendant being needed at the location of the throwing machine.

*General drive mechanism*

In order to be able better to understand the operation of the individual units or components of the machine, as further described below, it will be convenient first to point out that the machine comprises a main base or stationary frame partially indicated at 31 in Figs. 1, 2, and 4. On this is mounted an electric driving motor 33 the shaft 35 of which is slightly inclined to the horizontal as shown, and is provided with a worm gear 37 meshing with a worm wheel 39 on an upright but slightly inclined shaft 41. Just above the worm wheel 39 is a bevel gear 43 fixed to the shaft 41 to turn therewith, meshing with another bevel gear 45 on a horizontal shaft 47 which drives the conveyor mechanism for moving the stacks of targets as needed. The upper end of the shaft 41 enters a single revolution clutch mechanism indicated in general at 51, of any known form, the internal details of which are not important for purposes of the present invention.

The upper part of the shaft, above the single revolution clutch 51, is indicated at 53, and is provided at its upper end with a universal joint 55, above which is a short shaft section 57 arranged vertically, journaled in a suitable bearing flange 59 on a fixed part 61 of the casing or housing or frame of the machine.

The motor 33 runs continuously while the machine is in operation, so that the shaft 41 turns continuously, and, through the bevel gears 43 and 45, continuously drives the conveyor operating shaft 47. Each time that the single revolution clutch 51 is tripped, the shaft 53 is driven from the shaft 41 through a single revolution and then stops at the end of one revolution, until the clutch 51 is again tripped. The shafts 41 and 53 are in axial alinement with each other, and are tripped or inclined slightly (preferably about 5 degrees) to a vertical line, as well seen in Fig. 1. The universal joint 55 permits the inclined shaft 53 to drive the truly vertical terminal shaft portion 57, in spite of the angularity between these two shafts.

The shaft 57 has fixed to it a spur gear 65 meshing with a spur gear 67 of equal size fixed near the lower end of a vertical shaft 69 which is suitably journaled in stationary bearings in the fixed frame or housing part 61 and in a higher frame part 71 near the top of this shaft 69. This shaft, like the shaft 57 from which it is driven, does not turn continuously but turns one revolution at a time, each time that the single revolution clutch 51 is tripped. The shaft 69 carries various gears and cams for controlling the operation of feeding the targets one by one to the throwing arm, as will be described below.

*Target storage and conveyor mechanism*

Referring now particularly to Figs. 1, 2, 4, 6, 7, and 8, the storage and conveyor part of the machine includes a stationary framework of side bars 81 spaced laterally from each other, in which the ends of conveyor rollers 83 are journaled, the rollers being long enough to support any desired number of rows of stacked targets, each row containing any desired number of stacks. In the embodiment here shown (see particularly Fig. 2) each row contains three stacks 85. The number of rows of such stacks is limited only by the number of supporting rollers 83 employed. The side bars 81 may be extended to any desired length, so as to accommodate any desired number of rollers 83, the top surfaces of the rollers 83 collectively forming a bed or support on which the stacks 85 of targets rest. Ordinarily this support will be made large enough to hold at least several thousand targets, preferably at least one full day's supply. Preferably the side bars 81 are slightly tilted so that the roller conveyor inclines very slightly downwardly toward the rear, thus preventing the stacks of targets from accidentally creeping forward due to vibration of the machine.

Behind the farthest or most remote row of targets, there is a pusher of somewhat U-shaped form in top plan, comprising a cross bar 91 to engage the back edges of the rear row of targets and push them forwardly at appropriate times, the cross bar being supported from end brackets 93 which ride on the top edges of the side bars 81 as guiding rails and engage at 94 (Fig. 8) under an overhanging fixed flange, and which are connected by connecting links 95 to two belts 97, one at each side of the frame 81, running over pulleys 99 on a shaft 101 near the front of the conveyor, and similar pulleys on a similar cross shaft (not shown) at the rear or remote end of the roller conveyor.

At one end of the shaft 101 (the right hand end, when facing the machine as in Figs. 1 and 2) there is a second pulley 105 connected by a belt 107 to a driving pulley 109 on a shaft 111 which is in alignment with the previously mentioned shaft 47 (Fig. 1) and connected thereto through the mechanism of a single revolution clutch 113, the interior construction of which is unimportant for purposes of the present invention. Any suitable known form of single revolution clutch may be used. As explained above, the shaft 47 is driven continuously by the motor 33, but due to the interposition of the clutch 113, the shaft 111 is driven only when the single revolution clutch 113 is tripped, and then is driven only for one complete revolution, after which it stops. The sizes of the pulleys 105 and 109 are so proportioned that when the shaft 111 is driven through one complete revolution, the belts 97 will advance the pusher 91 through a distance equal to the diameter of one stack of targets. Hence a fresh row of stacked targets will be pushed forward to the final or front row position of the machine, ready to be fed laterally into delivery position. The delivery position is the position of the left hand stack of targets shown in Fig. 1, or the left hand stack of the front row shown in Fig. 2, being the position between the curved holding arms or fingers 121 and 123 which will be further described below.

Figure 1:
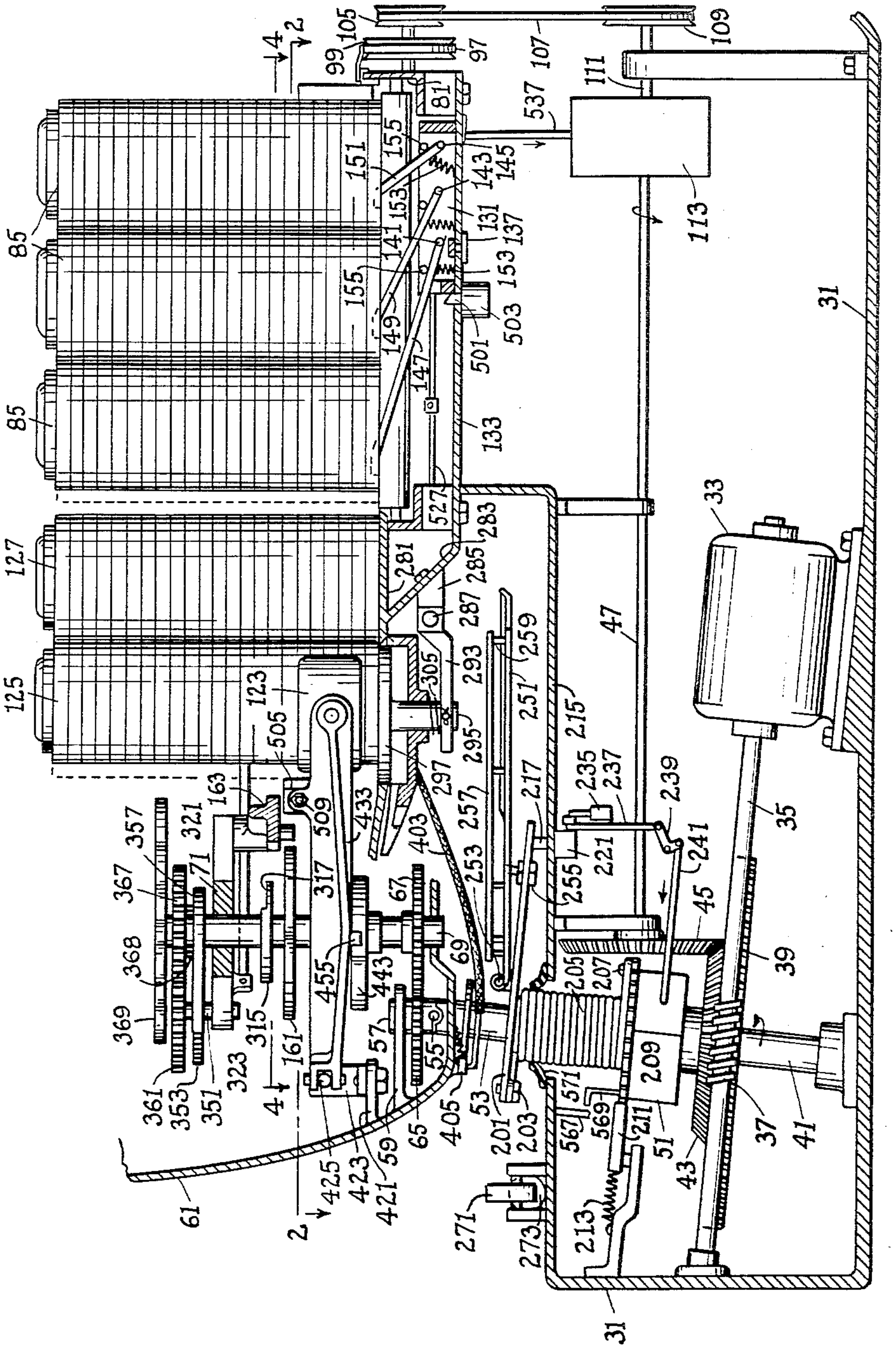
Fig. 1 is an elevation of a machine in accordance with a preferred embodiment of the invention, with parts broken away and parts in vertical section.
Figures 2, 3:
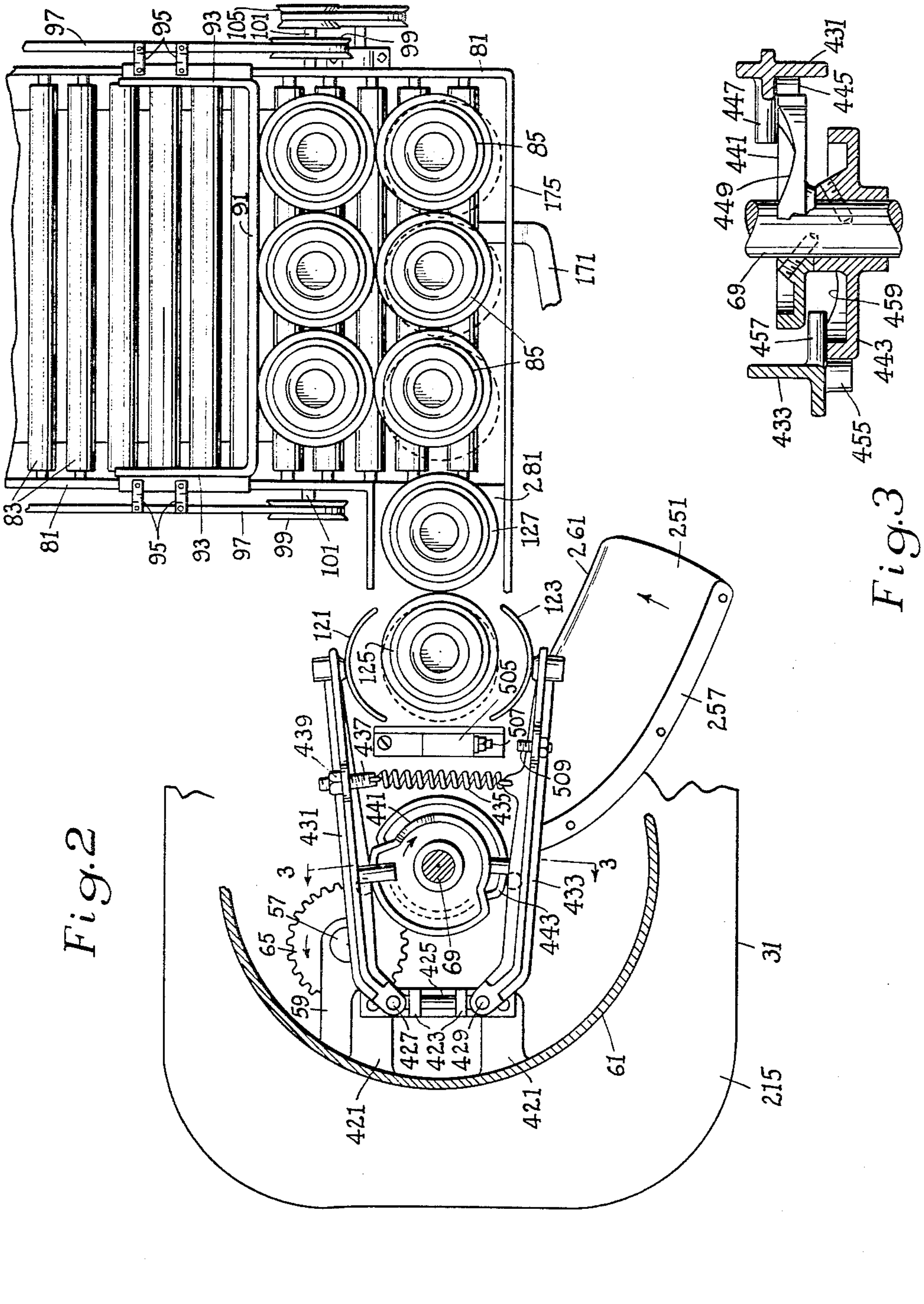
Fig. 2 is a top plan view of the machine, with parts broken away and parts in horizontal section taken approximately on the line 2—2 of Fig. 1.
Fig. 3 is a vertical section taken substantially on the line 3—3 of Fig. 2, on a larger scale.

It will be noted from Fig. 2 that the stack of targets in delivery position, here designated for convenience by the numeral 125, and the next stack to it, here designated by the numeral 127, both lie to the left of the left edge of the roller conveyor 83. They are moved to this position by certain pushing mechanism which keeps one stack always in the delivery position 125 so long as any unused targets remain. This pushing mechanism comprises a pushing block 131 sliding rightwardly and leftwardly (Figs. 1, 4 and 7) on the flat surface of a stationary support plate 133 constituting part of the fixed housing, and guided by a guide portion 135 extending downwardly through a guide slot 136 in the plate 133, terminating in a washer or other enlarged portion 137 which is fixed to the portion 135 and underlies the plate 133, to prevent the pushing block 131 from rising upwardly.

The pushing block 131 is hollow, and pivoted within it on the pivots 141, 143, and 145, respectively, are the pusher rods or fingers or bars 147, 149, and 151, equal in number to the number of stacks of targets in each row on the conveyor. In the particular form shown, there are three stacks of targets in each row, so three pusher rods are provided.

The pivots 141, 143, and 145 of the pusher rods are arranged horizontally, parallel to each other, so that the pushers may swing upwardly and downwardly in a vertical plane which is just a little forwardly of the center line of the final or front row of targets as fed by an operation of the member 91. Each pusher bar 147, 149, 151 has a spring 153 (Fig. 1) tending to elevate the free or left hand end of the bar, so that the free end of the bar may rise up into the usual hollow space within a target of the clay pigeon kind or style. Cross pins 155 in the block 131 act as stops to limit upward swinging movement of the pusher rods under the influence of their springs 153, so that these arms cannot rise above the position shown in Fig. 1, where the upper or free end of each rod is just above the plane of the bottoms of the targets.

Figures 4, 5:
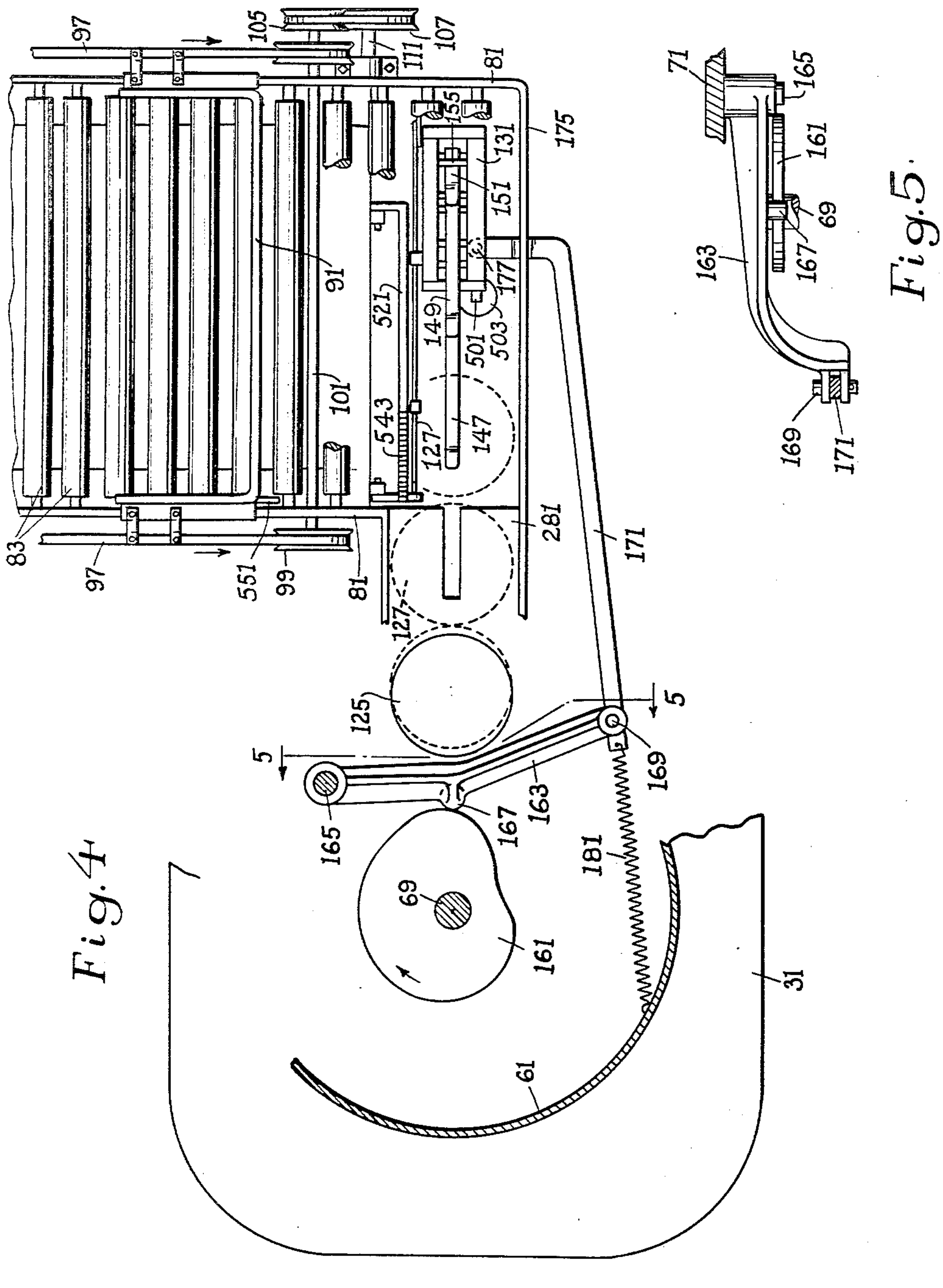
Fig. 4 is a view partly in plan and partly in horizontal section taken approximately on the line 4—4 of Fig. 1, with parts broken away, illustrating particularly the conveyor and mechanism for feeding the last row of targets or pigeons from the conveyor to throwing position.
Fig. 5 is a fragmentary vertical section taken substantially on the line 5—5 of Fig. 4.

It will be apparent from Figs. 1, 2, and 4 that if the pushing block 131 is moved leftwardly from the normal rest position shown in Figs. 1 and 4, the pusher rods 147, 149, and 151 engaging inside the bottom flanges of the stacks of targets in the front row will push the targets of this row leftwardly toward the holding arms 121, 123. The pushing block is preferably moved in one direction by a cam and in the opposite direction by a resilient spring. In the present construction, the resilient spring furnishes the power for moving the pushing block in a feeding direction, so that if the motion is obstructed, no damage results, and the cam is used to restore the pushing block to its normal rest position. The connections for accomplishing this are shown chiefly in Fig. 4, which should be read in conjunction with Fig. 1.

On the shaft 69, below the stationary support 71, is a cam 161 of the shape best shown in Fig. 4. A follower lever 163 (Figs. 1, 4, and 5) is pivoted to the stationary support 71 at 165, and at an intermediate point of the length of the arm it has a cam-engaging follower portion 167 riding on the periphery of the cam 161. The free end of the lever is connected at 169 to the left end of a link rod 171 which extends thence rightwardly and downwardly and then rearwardly through a slot 173 (Fig. 6) in the casing or housing wall 175, to the pushing block 131, to which it is pivotally connected at 177 (Fig. 4). The cam follower arm 163 is also connected to the right end of a coiled tension spring 181 (Fig. 4) the opposite end of which is connected to the fixed casing or housing 61. It will be remembered that the shaft 69, to which the cam 161 is fixed, makes only a single revolution at a time, when the mechanism is tripped. The normal rest position of this cam, between revolutions, is the position shown in Fig. 4, in which the high point of the cam is engaged with the part 167 of the lever 163, to hold this lever in its rightward position, with the link 171 and the pushing block 131 also held in their rightward positions. When the shaft 69 turns (in a clockwise direction when viewed from above as in Fig. 4) the radius of the cam gradually decreases from the high point, through most of the revolution. If nothing is holding the pushing block 131 against movement, the spring 181 pulls the follower lever 163, keeping it in contact with the cam 161, and thus pulls the pushing block 131 leftwardly, so that the pusher rods 147, 149, and 151, engaging their respective stacks of targets, will push these targets leftwardly toward the arms 121, 123. If, however, there is any substantial obstruction to such leftward movement of the pushing block 131, the strength of the spring 181 cannot overcome such obstruction and the arm 163 will simply remain in its rest position or approximately in this position, without following against the cam. If the arm 163 does move leftwardly during a feeding movement of the pushing block 131, then the rise in the final part of the cam 161, near the end of the single revolution of the shaft 69, will restore the follower arm 163, the link 171, and the pushing block 131 rightwardly to the normal rest position of these parts.

The maximum range of movement of the pushing block 131, from the highest point to the lowest point of the cam 161, is a little more than the diameter of one stack of targets. The stacks of targets in each row placed on the conveyor in the initial loading operation are preferably placed tightly against each other in the direction of the row (that is, parallel to the direction of the rollers 83) as seen in Fig. 2, and the several rows are tight against each other, so that the stacks mutually support each other against side sway. The push rods 147, 149, and 151 are of such lengths, however, as to separate the stacks in the front row slightly from each other, during the first push after these stacks reach front row position.

It may also be pointed out here that the ends of the push rods lie just a little forwardly of the center line of the position to which the last or final row of targets is fed by the mechanism (pusher 91, etc.) which moves the rows of targets along the roller conveyor 83 toward the front of the machine. Therefore, during the next pushing operation after a fresh row of targets has been delivered to front row position, the action of the push rods 147, 149, and 151 will pull this front row of targets slightly forwardly from the full line position (Fig. 2) in which they initially stopped, to the dotted line position shown in Fig. 2, to separate them forwardly from the next row of targets to the rear, thereby avoiding friction with the row to the rear when feeding the targets leftwardly toward the delivery position 125.

The controls for feeding stacks of targets along the front or final row of targets, and for feeding a fresh row of targets into the front row position when necessary, can best be understood when the description of other parts of the machine has proceeded somewhat further. So the description will revert later to such controls, and for the present it will be assumed that the various stacks of targets are fed when necessary, so that the target stack positions designated by the numerals 125 and 127 in Figs. 1 and 2 are kept suitably supplied with sufficient targets.

*Target throwing arm*

Rotatable on the shaft 53 and having a suitable bearing thereon, is a plate 201 (Figs. 1 and 9) which is secured by a bolt 203 to the upper end of a powerful coil spring 205 which surrounds the shaft 53 above the single revolution clutch 51. The bolt may be placed in any one of a series of holes 206 (Fig. 9) to vary the tension of the spring when wound up to its normal starting position. The lower end of this spring is fixed at 207 (Fig. 1) to a ratchet wheel 209 fixed to the shaft 53 to turn therewith one revolution at a time when the single revolution clutch 51 is tripped, the ratchet 209 being just above the clutch box. A pawl 211 urged by a spring 213 into engagement with the ratchet 209, holds the ratchet against retrograde motion. It is apparent that if the plate 201 is held against rotation, and if the shaft 53 with the ratchet 209 is turned, this will wind up the spring 205, and the spring will stay wound so long as the plate 201 is prevented from turning and the pawl 211 prevents the ratchet 209 from turning backward.

Just below the plate 201 is a horizontal portion 215 of the stationary casing, and on this stationary portion, in a position to engage an edge of the plate 201, is a latch indicated in general at 217 in Fig. 1. Further details of the latch are shown in Figs. 17–19, from which it is seen that the latch 217 is pivoted at 219 in a stationary bracket 221, and is in the general form of a quadrant, one edge of which engages an edge of the plate 201, and the other edge of the quadrant engages a flattened side of a control rod 223 which is mounted for rotation in the bracket 221. In the position shown in Fig. 18, the flattened side of the rod 223 forms a rest or abutment for the latch member 217 so the latch member cannot turn on its pivot 219, and it holds the plate 201 against rotation under the influence of the spring 205. If the flat side of the rod 223 is turned counterclockwise from the full line position to the dotted line position of Fig. 18, however, then the edge of the latch 217 can slip past the rod 223, in a clockwise direction on its pivot 219, under the influence of the pressure trying to move the plate 201, and the plate can turn under the power of the wound spring 205. After the plate slips by, the light spring 225 connected to the latch 217 will restore the latch to normal latching position, and the rod 223 can be turned back in a clockwise direction from the dotted line position to the full line position, holding the latch again in effective position ready to catch the plate 201 at the end of its single revolution. It will be noted that the rotary restoring motion of the rod 223 in a clockwise direction will itself tend to raise the overlying part of the latch 217 and restore it to normal latching position, thus assisting the spring 225 in the restoring operation.

To turn the rod 223 in order to release the latch so that a target can be thrown in a manner further described below, the rod 223 is fixed to an operating arm 231 (Fig. 17) which is connected at 233 to the armature of a solenoid 235 which, when energized, serves to swing the arm 231 to turn the rod 223 to release the latch. If desired, a rotary solenoid or a fractional-turn motor may be substituted for the straight-line solenoid 235, and may be attached directly to the shaft or rod 223 to turn it. The arm 231 is connected by a link 237 (Figs. 1 and 17) and a bellcrank 239 to the operating rod or trip rod 241 of the single revolution clutch 51. Thus each time the solenoid 235 is energized, it serves not only to release the latch 217 so that the plate 201 may swing under the influence of the power spring 205, but also to trip the single revolution clutch 51 so that the shaft 53 will make one revolution again to wind up the spring 205 ready for the next throwing operation. A light spring (not shown) restores the parts 237, 241, etc., to normal position when the electric circuit through the solenoid 235 is opened, which opening is accomplished, as further described below, by the switch 567 as soon as the clutch begins to turn.

The throwing arm itself is indicated at 251, and is mounted on the plate 201 preferably in an adjustable manner such as by being hinged to the plate at the hinge 253. The throwing arm is in the form of a flat plate, curved in horizontal plan as seen in Fig. 9, the curve being in such manner that the direction of the plate at the end closest to the shaft 53 is approximately tangential, the axis of the arm then curving outwardly away from the shaft so that the outer end of the arm extends approximately radially to the shaft 53. The shaft, as will be readily seen from Fig. 9, in other words lies on the outside of convex side of the curve of the throwing arm 251. The curvature near the inner end of the arm is such that when the throwing arm is in its rest position, this curved portion is curved rather sharply in the vicinity of the target delivery disk or platform 297 (to be described below). Further out, toward the free outer end of the arm, it may be curved on a much greater radius, or even approximately straight.

The hinge 253 by which the arm is mounted on the plate 201 is arranged roughly parallel to the inner end of the throwing arm. An adjusting screw 255 is connected both to the plate 201 and to the bottom of the throwing arm 251 at a point spaced outwardly from the hinge 253, to hold the throwing arm at a slight upward inclination relative to the plate 201, which inclination can be adjusted by moving the adjusting screw 255. Since the screw is connected to both of these parts, the throwing arm is held firmly at the desired inclination to the plate 201 and does not wobble or shift either upwardly or downwardly. The relationship of the angles of the parts is well shown in Fig. 1. In the rest position or normal loading position of the throwing arm 251, the hinge 253 is on the low side of the plate 201, it being remembered that the shaft 53 is at a slight inclination to the vertical. Preferably the screw 255 is adjusted so that in the rest or loading position, the arm 251 is approximately horizontal, as seen in Fig. 1, although this is not necessarily so. It is found, however, that good results are obtained, if the shaft 53 is inclined at about 5 degrees to the vertical, and if the throwing arm 251 is inclined at about 5 degrees to the plate 201. The throwing arm will then be horizontal or approximately so in the rest position, and when the arm reaches the position in which the target leaves the arm, approximately 180 degrees from the rest position shown in Figs. 1 and 9, the arm will then be inclined upwardly at an angle of about 10 degrees to the horizontal, thus starting the trajectory of the target along a path at a 10 degree upward inclination. But by turning the adjusting screw 255, this upward inclination at the throwing position can be varied either upwardly or downwardly from 10 degrees, which is merely a convenient average inclination, subject to such variation as the sportsman may desire.

Along the outer or convex side of its curve, the throwing arm 251 has a raised guide strip or rail 257 secured to the arm 251 by spacers 259. This strip 257 is made of material somewhat softer than the rigid metal from which the arm 251 itself is made, and preferably is of hard fiber or wood, so as to have good wearing qualities and good frictional contact with the target, to cause the target to rotate rather than slide along the rail, and to minimize the chance of cracking or chipping the target when it comes into initial contact with the rail. At its inner or concave edge, the arm 251 is bent slightly upwardly to form a low lip 261, extending at least through the first half of the length of the target, though it may be omitted in the outer half. These parts are shown in cross section in Fig. 13, which also illustrates the shape of the typical target 263 of the kind known as a clay pigeon. As seen in this view and in Fig. 15, the customary clay pigeon is of somewhat domed hollow shape, the maximum diameter being the bottom skirt or flange 265, at the top of which is a shoulder 267 leading to a cylindrical part 269 of somewhat smaller diameter than the part 265. It will be observed from Fig. 13 that the guide rail 257 is at an elevation slightly above the shoulder 267 of the target, and it contacts with the cylindrical part 269 of the target. The lip 261 is far enough away from the guide rail 257 so that it does not ordinarily make contact with the target 263 and normally does not create any frictional drag on the target as the latter moves along the throwing arm, but it will prevent any substantial accidental lateral displacement of the target by vibration of the machine, if a long interval elapses between throws and while the motor of the machine is left running.

The placement of a fresh target on the throwing arm will be described later under the heading "Delivery of target to throwing arm." Assuming for the moment that there is a fresh target on the throwing arm, the solenoid 235 is energized when it is desired to have the target thrown. As already explained, this releases the latch 217, so that the power of the previously wound spring 205 turns the plate 201 rapidly in a counterclockwise direction when viewed from above as in Fig. 9, and of course carries the throwing arm 251 counterclockwise around with it, from the rest or target placement position shown in full lines in Fig. 9, toward the ejection position shown in dotted lines in Fig. 9.

As the throwing arm accelerates from its stationary or rest position, the target 263 begins to roll outwardly along the curve of the guide rail 257, due both to the inertia effect of the initially stationary target and also to the centrifugal effect. About the time that the throwing arm has turned 180 degrees to the dotted line position of Fig. 9, the target reaches the outer end of the throwing arm and is ejected or projected radially outwardly and at a slight upward inclination, the degree of upward inclination depending on the adjustment of the screw 255 which controls the vertical angle between the throwing arm 251 and the plate 201. At just about the time the target is thrown from the arm, the outer corner of the plate 201 comes in contact with a snubber 271 of any suitable kind, preferably in the form of an upstanding pivoted lever connected to a pneumatic dashpot 273. The contact of this corner or heel of the throwing arm with the snubber 271 momentarily slows down the turning movement of the throwing arm and the plate 201, until the snubber lever 271 moves far enough (against the force of the pneumatic dashpot 273) to allow the throwing arm to slip past. Then the throwing arm and the plate 201 continue their counterclockwise travel until the throwing arm again comes into contact with the latch 217, as a considerably reduced velocity so that it may readily be stopped when it hits the latch, without damage to the parts.

Meanwhile, the same energization of the solenoid 235 which trips the latch 217 has also tripped the actuating member 241 of the single revolution clutch 51, so that the motor 33 is in process of turning the shaft 53 through a single revolution. The turning of this shaft, however, is much slower than the swinging of the throwing arm under the power of the spring 205, and the shaft has turned through only a fraction of a revolution by the time that the throwing arm has ejected the target, has been snubbed by the snubber 271, and has been restored to its normal rest position against the latch 217. After the throwing arm has come to rest, the shaft 53 continues its single revolution, thus rewinding the spring 205, and comes to rest at the end of the single revolution because of the disengagement of the single revolution clutch 51, the spring being held against retrograde or unwinding movement by the pawl 211 engaging the ratchet 209.

*Delivery of target to throwing arm*

After the completion of one throwing operation, a fresh target is delivered to the throwing arm by taking the bottom target from the last or final stack 125, and moving it down a chute to the throwing arm, the mechanism being so arranged that in successive cycles of operation, the target is delivered to various different positions on the throwing arm, rather than being delivered always to a given or set position thereon. The variation in the initial starting position of the target on the throwing arm, when the rotation of the throwing arm commences, results in giving the target a different and unpredictable trajectory on various successive throws or cycles of operation.

To the left of the front or final row of targets on the roller conveyor 82, there is a stationary shelf or support 281 (Figs. 1, 2, and 4) which supports the next to the last stack 127 of targets. To the left of this stationary support 281 there is a movable support constituting a chute assembly, which delivers targets one by one from the final or delivery stack 125, onto the throwing arm 251. The construction of this chute assembly and its associated parts is best shown in detail in Figs. 13–16, some of the features also being shown in the more general views, Figs. 1 and 9.

On a fixed part 283 of the frame or casing, there are leftwardly extending bracket ears 285 in which is journaled a horizontal shaft 287 to which is fixed, between the ears 285, a block 289. The block 289 is bored to form a bearing or journal for a stub pivot 291 extending substantially perpendicular to the axis of the shaft 287, which stub shaft 291 supports a bracket 293 which extends leftwardly from the block 289 and which carries near its left end an upstanding post 295 fixed to the bracket 293 so it can neither turn nor slide longitudinally. At the top of this post 295 is a circular disk-like head or platform 297 of a diameter very slightly larger than the target. In the normal rest position of the parts this head 297 is centered directly below the last or final stack 125 of targets in the delivery position, and the disk may be called the delivery disk or platform. The bearing of the pivot 291 in the block 289 should be sufficiently tight to tend to hold the bracket 293 in any angular position in which it may be at the moment. Although the pivot may turn when some rotary force is applied, it should not flap around loosely. Hence a friction spring at this point is desirable, as shown at 299 in Fig. 14. The ability of the bracket to turn on the pivot 291 enables the two side edges of the lower end of the delivery chute always to come down equally tightly against the top surface of the throwing arm, in spite of differences in inclination of the throwing arm at various points where the delivery chute may come down onto it from time to time.

Pivoted on the post or shank 295, to rotate thereon and also to move axially thereon, is the target delivery chute 301 having a central depressed portion 303 forming a pocket of sufficient diameter to receive the disk 297. A coil compression spring 305 surrounding the shank 295 between the bracket 293 and the bottom of the chute 301, tends to force the chute 301 axially upwardly along the shaft 295. When the bracket 293 is swung up to its normal rest position shown in full lines in Fig. 13, a rim 307 at the right edge of the depression 303 comes up against the bottom of the stationary support 281 and forces the entire chute 301 down against the action of the spring 305, to the relatively depressed position shown in Fig. 13. When, however, the bracket 293 is swung downwardly by rotating the shaft 287 in a counterclockwise direction, as will be explained hereafter, the downward pressure caused by the fixed part 281 on the flange 307 is relieved, and then the spring 305 may move the chute 301 axially along the shaft or post 295, in a direction toward the delivery disk 297, so that the main surface of the chute 301 comes up flush with the top of the disk 297. In this position, the rim 307 closely encircles about half of the periphery or circumference of the disk 297, and the rim then extends approximately tangentially leftwardly from the disk 297 with slightly raised portions 309 parallel to each other as seen in Fig. 14, to form side guides for the target which is now to be moved leftwardly along the top surface of the chute 301. The central part of the chute between the side guide flanges 309 is cut away on a curve as shown at 311, while the guides 309 themselves extend somewhat beyond this cut away portion and are curved upwardly as well seen in Fig. 13.

There is mechanism for operating the chute in two directions or with two motions; that is, for swinging the entire chute assembly, including the supporting bracket 293, downwardly from the target receiving position shown in full lines in Fig. 13 to the target delivering position shown in dotted lines, by turning the shaft 287, and also mechanism for swinging the entire chute 301 around the post or shaft 295, so as to vary the position at which the target is delivered to the throwing arm 251.

The mechanism for swinging the chute assembly upwardly and downwardly, by turning the shaft 287, will now be described with reference to Figs. 1, 13, 14, and 16. The shaft 69 has fixed to it a cam 315, located above the cam 161 (Fig. 1) and below the stationary frame member 71. This cam 315 is in the form of a disk having a top surface which is flat throughout most of its area but notched or depressed at 317 (Fig. 14) through about one-quarter of its periphery, the notch being tapered or inclined at its trailing edge so as to raise up the cam follower pin 319 which is on a lever 321 pivoted at 323 to ears on the bottom of the stationary support 71.

As the shaft 69 rotates (in a clockwise direction as viewed from above as in Fig. 14) the pin 319 rides on the flat top surface of the cam disk 315 through about three-quarters of a revolution, holding the lever 321 in an elevated position. When the leading edge of the notch 317 reaches the cam follower pin 319, the pin drops down, thereby allowing the right hand end of the lever 321 to drop downwardly.

This right hand end of the lever is connected through a somewhat flexible resilient connection, to an approximately vertical rod 327 which extends downwardly from the elevation of the lever 321 to the elevation of the shaft 287 on which the chute assembly is mounted. The bottom end of the rod 327 is pivoted at 329 (Fig. 13) to an arm 331 fixed to the shaft 287. During the time that the notch 317 is beneath the pin 319, the rod 327 is in its downward position, the arm 331 is in its downward position, and the shaft 287 is turned so as to bring the chute assembly to the position shown in dotted lines in Fig. 13, with the left end of the chute lying on the top of the throwing arm 251. During the remainder of the rotation of the cam 315, the pin 319 rides on the top of the cam, thus holding the lever 321 in its upper position, which in turn holds the chute assembly in its upper or normal rest position shown in full lines in Fig. 13. If the portion of the throwing arm engaged by the chute is somewhat tilted, the reaction of the throwing arm against the side guides 309 of the chute, as it drops down onto the throwing arm, will serve to tilt the chute laterally (on the pivot 291) to a corresponding angle, so that both side guides 309 will come down equally snugly onto the surface of the throwing arm, to guide the descending target properly onto the arm. When the chute moves upwardly again, the contact of the rim 307 with the stationary plate 281 will serve to turn the chute again on its pivot 291, to straighten any lateral inclination that may have been given to the chute during its downward movement.

Due to the swinging movement of the chute 301 on the post 295, as further described below, the chute sometimes engages one portion of the throwing arm 251 and sometimes another portion. Since the throwing arm 251 may at this time be at some inclination rather than level (depending on the exact adjustment of the adjusting screw 255) it follows that sometimes the chute must drop down farther than at other times. Therefore, some resilience or lost motion or play in the operating connection is desirable. For this purpose, the rod 327 may be connected to the lever 321 through the resilient or lost motion connection shown in Fig. 16.

The resilient or lost motion connection may take various forms, one convenient form being shown in Fig. 16. The rod 327 has a lateral pin 335 which, instead of being confined snugly in a hole in the lever 321, extends into a rather wide notch 337 in the lever. A leaf spring 339 located in this notch 337 overlies the pin 335 and tends to keep it in contact with the lower face of the notch. A suitable guide eye 341 on the side of the lever 321 keeps the rod 327 in proper alinement against accidental lateral displacement. As the lever 321 drops downwardly (when the notch 317 comes around to the pin 319) the rod 327 will go down with it through its maximum extent of downward travel, if the chute 301 can move this far downwardly before its downward motion is stopped by contact with the throwing arm 251. However, if the throwing arm happens to be positioned a little higher so that the downward motion of the chute is stopped, the lever 321 can still complete its full downward swing even when the rod 327 stops, because the spring 339 will flex upwardly to a sufficient extent. Lost motion is also provided by the fact that the pin 319 simply rests loosely on top of the cam 315 and does not have to drop all the way to the bottom of the notch 317, and when this form of cam is used, a direct pivoted connection between the arm 321 and the rod 327 could be used. But the lost motion connection or resilient connection shown in Fig. 16 permits a box cam to be used in place of the simple cam 315, if desired.

For swinging the chute 301 on the post 295, so as to deliver the target to a variable position on the throwing arm 251, the following mechanism is provided, referring particularly to Figs. 1 and 9–12.

Supported from the stationary member 71 is an upright stationary shaft 351, parallel to and offset laterally from the upper end of the shaft 69. Rotatable on this shaft 351 is a ratchet wheel 353 (Figs. 1 and 12) which is engaged and driven by a pawl 355 mounted on an eccentric strap 357 which surrounds and is driven by an eccentric 359 fixed to the shaft 69 to turn therewith. Each time that the shaft 69 rotates through one revolution, the action of the eccentric 359 will drive the pawl 355 to advance the ratchet 353 through the distance of one tooth. The clockwise direction of rotation of the eccentric 359 serves, through the frictional engagement with the eccentric strap 357, to keep the operating end of the pawl 355 in contact with the ratchet wheel 353, so that no spring is needed for this purpose, although if desired a light spring may be employed as extra insurance that the end of the pawl will remain in contact with the ratchet.

Removably mounted on the fixed shaft 351 above the ratchet 353 is an interchangeable spur gear 361, suitably connected to turn with the ratchet wheel 353 in any manner which will not interfere with quick detachability and replacement of the gear 361. For instance, the ratchet 353 may be provided with an upstanding pin 363 offset laterally from the shaft 351, and this pin may enter a hole 365 in the spur gear 361. The teeth of this gear 361 mesh with teeth on another interchangeable and replaceable spur gear 367 which rotates freely on the shaft 69 near its upper end, and which is held at the proper elevation for meshing with the gear 361 by means of a spacer sleeve 368 (Fig. 1) which rests on top of the eccentric 359.

Loose on the upper end of the shaft 69, just above the spur gear 367, is the control cam 369 having an irregular periphery as shown in Fig. 10, and detachably connected to the gear 367 to turn therewith by any suitable connecting means, such as the pin 371 fixed to the gear 367, offset from the shaft 69, and extending upwardly into a hole 373 in the cam 369. A bellcrank lever 375 is pivoted to the fixed casing 61 at 377, and has a short arm provided with a cam follower roller 379 engaging the irregular periphery of the cam 369. The longer arm of this bellcrank lever extends rightwardly and is pivoted at 381 by a rather loose or universal joint pivot to the upper front end of a rod 383, which extends downwardly and rearwardly, the rear end of which is pivoted at 385 by another loose or universal joint pivot to the under side of the chute 301 at a point offset somewhat rightwardly from the post 295 on which this chute is rotatable.

As the cam 369 turns, different portions of its irregular periphery will engage the follower roller 379 so as to swing the bellcrank lever 375 to one position or another. This swinging of the bellcrank lever, transmitted to the rod 383, serves to swing the chute 301 on the post or shaft 295, so that the left or delivery end of the chute does not always come down onto the throwing arm 251 at the same position, but comes down at various different positions along the throwing arm, varying the position at which the target is delivered to the throwing arm by a range of as much as six inches or more. It is found in practice that when the point of initial delivery of the target to the throwing arm is varied in this manner, the trajectory of the target as it leaves the throwing arm is also varied. Since the cam 369 has a rather long circumference, with many depressions and projections, and since the feed mechanism comprising the pawl and ratchet 355, 353, and the gears 361 and 367 serves to move the cam 369 through only a small fraction of a revolution during each cycle of operation of the machine, it follows that there will be no repetition of the exact sequence of variations in the trajectory of the target except after a great many throws, so that the sportsman cannot possibly remember the sequence of variations until the mechanism comes around to the same sequence again. Thus the throws of the target are unpredictable.

Moreover, to guard against even the slight chance of a sportsman remembering a given sequence of operation, variations can be introduced either by lifting the cam 369 off of the machine and replacing it by a different cam, or by changing the gears 361 and 367, or by both changing the gears to gears of different size and also using a new cam, at the beginning of a shooting match or meet or at various appropriate intervals during the progress of the shooting match or meet. Thus it is impossible for one sportsman to have an unfair advantage over another, due to the fact that he may have had more previous experience with this particular throwing machine.

However, in certain kinds of shooting meets, the target should always be thrown out in the same direction. When this is desired, a plain circular cam is used in the location 369, instead of an irregular cam. Then the target will always be delivered to the same point on the throwing arm, and will always be thrown in the same direction.

To move the target positively down the chute 301 in case it has any tendency to stick on the delivery disk or platform 297 when the disk and the chute are lowered, there is provided a finger 391 (Figs. 14 and 15) preferably in the form of a piece of wire hinged at 393 to a lateral extension 395 on the chute 301. This finger, in the rest position of the parts, normally occupies a notch at the upper edge of the rear rim 307 of the chute, as seen in Fig. 15. It is actuated by a push-pull cable or flexible cable of the kind often known as a Bowden cable or Bowden wire, comprising a wire 401 surrounded through most of its length by a flexible covering 403 which remains stationary in a longitudinal direction while the interior wire 401 is free to move through it. The right end of the wire 401 is connected to the target engaging finger 391, while the left end is connected to a cam follower lever 405 pivoted at 407 to the stationary casing or frame 61 and engaging a cam 409 secured to and turning with the shaft 53 in a location above the throwing arm plate 201 and just below the fixed casing 61. A spring 411 tends to keep the follower lever 405 in contact with the cam 409.

These various parts are timed or synchronized in such a way that after the throw of the target has been completed and when the throwing arm 251 has come back to its rest position with the plate 201 resting against the latch 217, during the latter part of the single revolution cycle, the notch 317 of the cam 315 comes underneath the pin 319 and allows the arm 321 to drop, thereby turning the shaft 287 and dropping the bracket 293 and delivery disk 297 downwardly from the horizontal position shown in full lines in Fig. 13 to the inclined position shown in dotted lines in the same figure. During this downward swinging, as the chute 301 drops away from the under side of the stationary part 281, the spring 305 will move the chute slightly upwardly along the post or shaft 295. The chute will at this time be in one or another of various possible positions in a rotary direction around the post 295, as controlled by the cam 369 and linkage 375, 383. By the time the left end of the chute reaches the top of the throwing arm 251, the chute will be at sufficient inclination so that gravity will ordinarily move the target down the chute onto the throwing arm 251 and against the guide rail 257, to the position shown at 263 in Fig. 13. However, if there is any tendency for the target to stick on the chute or on the delivery disk or platform 297 which, at this time, forms part of the surface of the chute, the stuck target will be dislodged and moved down the chute by the finger 391, when the high point of the cam 409 comes around and engages the follower lever 405, which pulls the wire 401 leftwardly, thereby swinging the finger 391 from the full line position toward and beyond the dotted line position of Fig. 14, so that the finger engages the target and starts it traveling down the chute. The travel of the finger 391 is sufficiently great to move the target all the way into contact with the rail 257. During such travel, the finger preferably rides on top of the shoulder 267 of the target and presses laterally against the surface 269 thereof. On the return movement, the above mentioned spring 411 and another spring 413 on the hinge pivot 393 move the finger back into its protecting notch 415 (Fig. 15) formed in the rim 307, where it comes to rest. The length of the control cable 401, 403 is such that when at rest, the finger 391 is always tight against the back of its notch 415, out of the way of the next target to be delivered, notwithstanding the swinging or turning of the chute.

It is necessary, of course, to make sure that only one target at a time will go down the chute. To this end, the next to the bottom target is supported by mechanism best seen in Figs. 1, 2, and 3.

The stationary casing or frame part 61 has a stationary flange or bracket 421 serving as a support for upstanding ears 423 in which is journaled a horizontal shaft 425. To the rear and front ends of this shaft there are respectively pivoted, on approximately vertically extending pivots 427 and 429, the left ends of the respective rear and front arms 431 and 433, which at their right hand ends respectively carry the curved fingers or pads 121 and 123 mentioned at an earlier point in the description. The arms 431 and 433 may move horizontally toward and away from each other, swinging on their pivots 427 and 429, and both arms together may swing upwardly and downwardly to a limited extent, the shaft 425 turning slightly in its supporting ears 423 when the arms swing vertically. A stiff tension spring 435 extends crosswise between the two arms and tends to draw their free or right hand ends toward each other, the tension of the spring being adjustable by a bolt 437 and nut 439 at one end of the spring.

To move these arms toward and away from each other and also swing them upwardly and downwardly, two cams are provided. Both cams are fixed to the shaft 69 to turn therewith (see especially Figs. 2 and 3) and the upper cam 441 controls the rear arm 431, while the lower cam 443 controls the front arm 433.

The arm 431 has a cam follower portion 445 which engages laterally against the periphery of the cam 441, thereby controlling the extent to which this arm swings closer to or farther away from the shaft 69. The arm also has another cam follower portion 447 which overlies an upstanding rim around the top surface of the cam 441, which rim holds the arm 431 at an elevated position through most of the revolution of the shaft 69. However, during a part of the revolution, a notch 449 in the top edge of the rim of the cam comes opposite the follower portion 447 and allows the arm 431 to drop down to a slight extent.

The other arm 433 is similarly constructed having a cam follower portion 455 which engages the periphery of the lower cam 443, and another follower portion 457 which overlies the upstanding rim of the bottom cam 443 and which, when the notch 459 comes opposite the portion 457, is allowed to drop downwardly so that the arm 433 may be depressed.

The pad members 121 and 123 are curved arcuately with their concave surfaces facing each other as seen in Fig. 2, and these concave surfaces are of the proper diameter to fit snugly against the stack of targets. When these members are at the normal elevation, with the cam follower parts 447 and 457 riding on the normal top faces of their respective cams and not engaged in the notches, the lower edges of the members 121 and 123 are just above the bottom edge of the next to the bottom target in the stack 125, so that when the members 121 and 123 are brought together toward each other they will serve to embrace and grasp the next to the bottom target and a few other targets above it, and thus will support all but the bottom one of this stack of targets, allowing only the bottom one of the targets to drop down when the chute assembly is tilted downwardly, and to slide down the chute to the throwing arm.

The inner or concave faces of the curved arms 121 and 123 may be suitably roughened so as to make good frictional contact with the targets which they are to support, or may be lined with rubber or other friction-increasing composition.

The timing or synchronization of the cams 441 and 443 to the cycle of operation of the machine is such that the arms 121, 431, and 123, 433 are held away from each other, separated laterally from the stack of targets, during the first part of each cycle of operation, while the throwing arm is rotating. During approximately the second half of the cycle, shortly before the cam 315 allows the arm 321 to drop to depress the chute assembly, the cut away or smaller radius parts of the cams 441 and 443 come opposite the follower portions 445 and 455, thus allowing the spring 435 to bring the curved arms 121 and 123 toward each other to grasp the next to the bottom target and others above it, with sufficient force to support the entire stack. At this time the arms 431, 433 are held at their normal elevation. Then the notch 317 of the cam 315 comes opposite the pin 319, and the chute assembly tilts downwardly so that the bottom one of the targets in the stack 125 is delivered onto the throwing arm 251. Then the end of the notch 317 reaches the pin 319, and the chute assembly is restored upwardly to its normal horizontal position. As the chute assembly reaches this normal position, the notches 449 and 459 in the cams 441 and 433, come opposite the follower portions 447 and 457, respectively, thereby allowing the arms 431 and 433 to drop slightly downwardly, carrying the entire stack of targets downwardly through a distance equal to the height of the vertical flange 265 (Fig. 15) on one of the targets. This occurs while the arms are still held tightly together in target-engaging position, by the spring 435, and the downward swinging of the arms results in lowering the entire stack of targets until the bottom one thereof now rests on the disk 297 of the chute assembly. While the arms are still in this lowered position, the larger radius parts of the cams 441 and 443 come oppposite the follower portions 445 and 455, so that the arms are separated away from the stack of targets and immediately after such separation, the follower portions 447 and 457 ride up out of the notches 449 and 459, to tilt the arms 431 and 433 upwardly again to their normal level or rest position. This is the position in which they remain at the end of the cycle of operation.

*Feeding targets to delivery position*

It has previously been explained that when the feeding block or pushing block 131 moves leftwardly from the rest position shown in Fig. 1, the push rods 147, 149, and 151 on this block, engaging the inside surfaces of the bottom flanges of the front row of stacks of targets on the conveyor, will tend to move this row of stacks leftwardly toward the delivery position indicated at 125, between the arms 121, 123. It has also been explained that this leftward feeding movement of the pushing block 131 is accomplished (when there is no obstruction to prevent it) by the spring 181 (Fig. 4) pulling leftwardly on the arm 163 and link 171, when the cam 161 is turned to a position allowing leftward movement of the arm 163. Of course this occurs only when the arms 121, 123, 431, 433 are fully separated to their wide open positions.

Such leftward feeding movement should not take place so long as there is any target remaining in the delivery position above the disk 297 of the chute assembly. Since there are a considerable number of targets in each stack or pile, it is only once in a considerable number of cycles of operation that a leftward feeding movement of the stacks is to take place. Hence there is provided a latch in the form of a plunger 501 (Figs. 1 and 4) mounted for vertical movement upwardly through an opening in the stationary casing wall 133 just to the left of the pushing block 131 and normally held in its upper or normal position shown in Fig. 1, obstructing leftward travel of the pushing block 131. The lower end of this plunger 501 is connected to an electric solenoid 503 which, when energized, withdraws the plunger downwardly so that it no longer obstructs leftward movement of the pushing block 131, and the spring 181 can then draw the pushing block leftwardly when permitted by the cam 161.

To operate this solenoid 503 to release the latch, there is a microswitch 505 (Figs. 1 and 2) mounted on a stationary bracket between the arms 431 and 433, and having a plunger end 507 adapted to be engaged by an adjustable actuating screw 509 mounted on the front arm 433.

In the normal movement of the arm 433, when two or more targets remain in delivery position above the supporting disk 297 of the chute assembly, the arm 433 does not swing far enough inwardly to engage and actuate the microswitch 505, because the presence of the targets prevents sufficient swinging movement of the arm. However, when only one target remains on the delivery disk 297, then at the next cycle of operation the arm 433 can swing somewhat closer toward the arm 431, because the bottom edge of the curved member 123 will lie above the shoulder 267 (see Fig. 15) of this last remaining target, thereby allowing the member 123 and its supporting arm 433 to swing somewhat closer to the center of the last remaining target, toward the smaller diameter part 269 thereof. The additional swinging movement of the arm, when only the last target remains on the delivery disk 297, is sufficient to cause the screw 509 on the arm to engage the plunger 507 of the microswitch, closing the switch 505 in the electric circuit indicated diagrammatically in Fig. 20, thereby energizing the solenoid 503 so as to withdraw the plunger latch 501 downwardly. At this moment, the follower 167 is riding on the high point of the cam 161, so, that there is no sudden leftward feeding of the stacks of targets with an impact which might break them or topple them over. The shape of the cam at first allows a very slight and gradual leftward movement of the parts 163, 171, 131, while the switch 507 remains closed and the latch 501 remains in its down or released position, enough so that the block 131 comes slightly over the latch 501, and prevents it from springing up to its latching position when the switch 507 opens. This initial leftward feeding may continue, for example, until the left stack 85 in the front row is in the intermediate position shown in dotted lines in Figs. 1 and 2, or even until it is tight against the stack 127. The chute assembly swings downwardly at this time, so that the last remaining target is delivered onto the throwing arm. As the chute assembly swings upwardly again, the continued turning of the cam 161 now allows the spring 181 to draw the pushing block 131 further leftwardly, but smoothly and without any sudden impact, thereby advancing the front row of targets on the conveyor one space to the left. The left hand stack of targets on the conveyor, engaged by the push rod 147, is thus pushed onto the stationary supporting plate 281, and it in turn contacts with the stack of targets 127 previously located on this stationary plate 281 and pushes this stack approximately into the delivery position 125 between the arms or members 121 and 123. The angular relationship or timing of the various cams to each other is such that this leftward feeding occurs only when the arms 121, 123 are fully open.

When the feeding motion is finished, the fresh stack of targets is not quite centered between the curved members 121 and 123, but is still a little to the right of center position, being in the position shown in full lines in Fig. 2. However, at the very next cycle of operation, the inward movement of the curved members 121 and 123 toward each other will engage this stack and center it by pulling it a little to the left of the position to which it was fed, that is, to the correctly centered position shown in dotted lines in Fig. 2. This has the effect of separating the final stack in delivery position 125 from the next adjacent stack in next-to-delivery position 127, by a slight space, which is desirable so that as the targets in the delivery stack are gradually fed downward one by one, they will not rub against the targets in the next stack and there will be no undesirable frictional impediment to the downward movement.

So long as any stack of targets remains in the front or final row of targets on the roller conveyor 83, there should be no forward feeding of another row by forward motion of the pusher 91. However, as soon as the last stack of targets in the front row has been fed leftwardly off the left ends of the rollers 83 and onto the stationary support 281, to occupy the position 127, then the pusher bar 91 should be actuated one step forwardly to bring another row of stacks to the front row position. This is accomplished as follows.

A bail member 521 (Figs. 6 and 7) extends longitudinally in the direction of the conveyor rollers 83, between the second and third rollers from the front, and is hinged at 523 to fixed lugs on the casing, the hinge axis being parallel to the axis of the conveyor rollers. The left hand side arm of the bail has a forward extension 525 provided with an eye through which passes the left end of a rod 527 longitudinally slidable to a limited extent through this eye, the right end of the rod being pivoted at 529 to a bellcrank 531 mounted on a fixed pivot 533. Another arm of the bellcrank is pivoted at 535 to the control rod 537 on the single revolution clutch 113 on the shaft 47.

Figure 6:
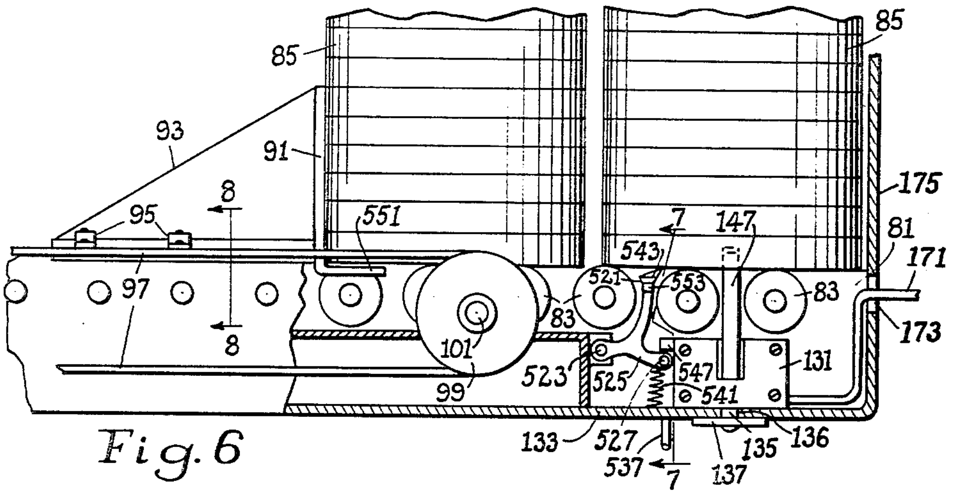
Fig. 6 is a fragmentary side elevation of the conveyor, with part of the housing broken away and parts in vertical section.
Figures 7, 8:
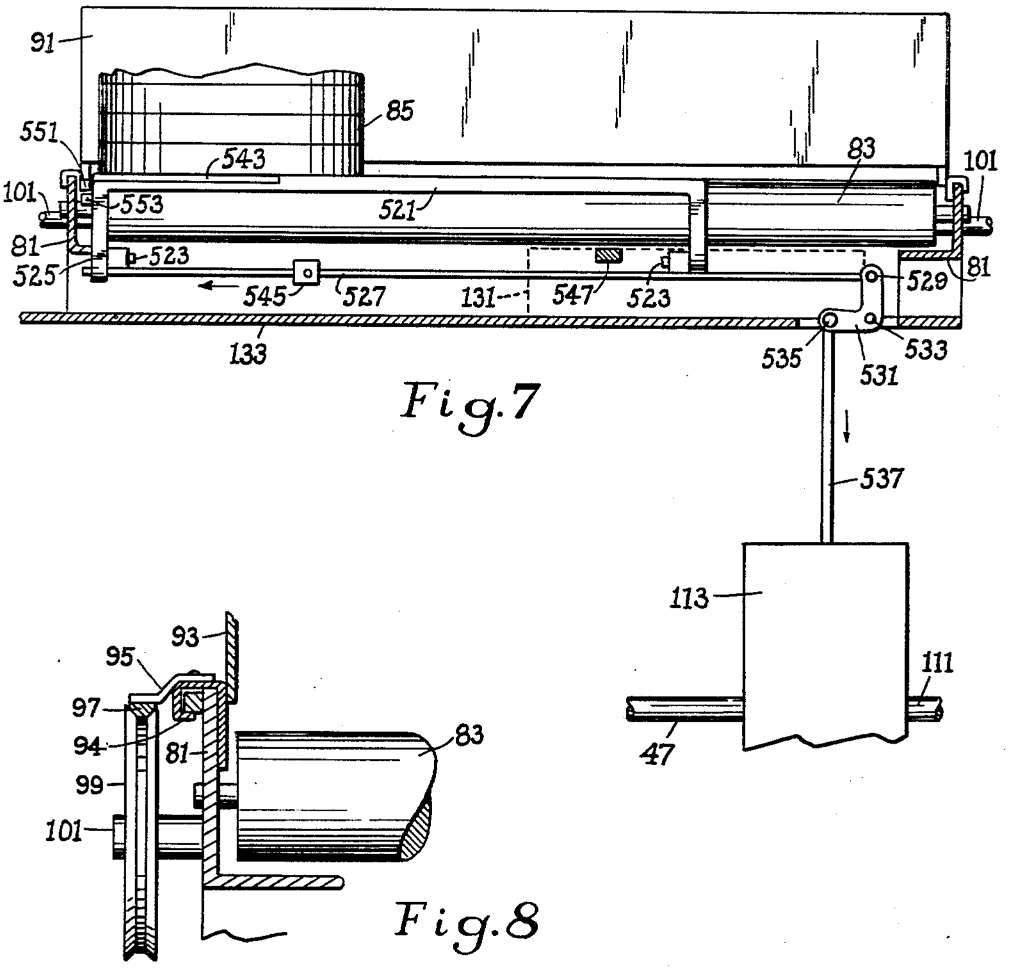
Fig. 7 is a vertical section taken approximately on the line 7—7 of Fig. 6.
Fig. 8 is a detail section taken substantially on the line 8—8 of Fig. 6, on a larger scale.

A spring 541 pressing upwardly on the forwardly extending arm 525 of the bail 521, tends to swing this arm upwardly or in a counterclockwise direction when viewed from the left end as in Fig. 6. So long as any stack of targets remains over the main part of the bail 521, the weight of such stack holds this bail depressed against the slight upward force of the spring 541, and thereby holds the rod 527 in a depressed position. The top edge of the bail 521 is notched out near its left end, however, as shown at 543. During a leftward feeding movement of the pusher block 131, to advance the front row of targets leftwardly, whenever the right hand stack of this front row of targets moves leftwardly to the position of the notch 543, the bail 521 is then able to spring slightly upwardly under the influence of the spring 541, thus raising the left end of the rod 527 just enough so that a block or lug 545 secured to this rod is raised high enough to lie in the path of travel of a lug 547 fixed to and projecting rearwardly from the rear edge of the pushing block 131. As the pushing block nears the left end of its range of travel, it will engage the lug 545 and move the rod 527 slightly to the left, thereby depressing the rod 537 and tripping the single revolution clutch 113 so that the shaft 111 will be clutched to the shaft 47 to make one single complete revolution. This revolution of the shaft 111 will, through the pulley 109, belt 107, and pulley 105, drive the belts 97 to move the pusher bar 91 forwardly toward the front of the machine, through a distance equal to the diameter of one stack of targets, thereby moving another row of stacks into the front row position on the front rollers 13 of the conveyor. Meanwhile the last stack previously in this front row has been fed leftwardly into the position 127 on the supporting plate 281, so that it does not interfere with the feeding of the new row of targets into the front row position.

The cam 161 restores the pushing block 131 rightwardly to its normal rest position, at the end of the cycle, and as the new row of targets moves forwardly onto the front rollers 83, the advancing edges of the targets depress the unnotched part of the bail 521 so that the left end of the rod 527 is once more depressed to a position where the lug 545 is out of line with the lug 547, and there will be no further tripping of the single revolution clutch 113 until all three stacks of targets now advanced to the front row have been fed leftwardly to make way for a new row of stacks.

As the last row of targets on the roller conveyor reaches the front row position, an extension piece 551 (Figs. 6 and 7) on the left end of the pusher 91 engages over a lug 553 on the bail 521, and holds the bail depressed even when the last stack in the front row has been fed leftwardly to or beyond the notch 543. Thus the clutch 113 is not tripped again, and there is no further forward feeding of the pusher 91. The pusher must now be moved rearwardly by hand and the follower conveyor must be reloaded with a new supply of targets.

If for any reason one of the stacks 85 in the front row does not feed leftwardly at the proper time (for example, the bottom flange of the bottom target in the right hand stack is partly broken away, so that the pusher rod does not engage it) the bail 521 will be held depressed and no further forward movement of the pusher 91 will take place until the situation has been corrected.

*Electrical connections*

The electrical connections are indicated diagrammatically in Fig. 20, and will in the main be obvious in view of the preceding description. Current is supplied to the machine through the main leads 561 and 563, through a main on and off switch, not shown. One branch circuit leads to the motor 33, which runs continuously so long as the machine is in operation. Another branch circuit goes to the solenoid 503, through the microswitch 505 operated by the screw 509 on the arm 433. A spring tends to hold the latch 501 in the up or latching position. Energization of the solenoid 503 pulls the latch down against the force of this spring.

The circuit through the tripping solenoid 235 passes through a tripping switch or cycling switch in the form of the push button 565, and also passes in series through a "normally open" safety microswitch 567 located on a suitable fixed part of the casing, such as the part 215 (Fig. 1) and operated to closed position by an arm 569 mounted on the ratchet 209, only when the ratchet 209 is in its normal rest position. The circuit is thus completed at this point, so that if the push button 565 is actuated, the circuit of the solenoid 235 will be closed and the latch 217 will be released and the single revolution clutch 51 will be tripped, to start the machine on a cycle of operation. If the operator accidentally holds his finger on the switch 565, instead of releasing it immediately after actuation, no harm will be done because the safety switch 567 will open as soon as the cycle starts, and will not close again until the completion of the cycle and the return of the parts to rest position, at which time it would be all right to press the starting button 565 again.

*Casing*

Various parts of the casing or housing, such as 31, 61, 133, and 215, have been mentioned from time to time as the description proceeded. These parts specifically mentioned, together with other parts omitted from the drawings for the sake of clarity, make up an outer shell which substantially completely encompasses and protects the entire mechanism except the throwing arm itself, from stray shots. In effect, the casing has the general shape, viewed from the front, of the letter U laid on its side. The lower horizontal leg of the U contains the motor 33, clutch 51, gears 43 and 45, and associated parts. The upper end of the shaft 53 and the entire shaft 69 with its various gears and cams, is within the upper horizontal leg of the U, while the throwing arm 251 and the plate 201 on which it is mounted swing through the space between the upper and lower arms of the U. The exterior casing or housing walls are curved wherever possible, for better deflection of stray shots that may hit the machine. The casing is substantially weatherproof, a rubber gasket or apron 571 (Fig. 1) being used around the spring 205, so there is no need to build a house around the machine, which can stand right out in the open.

*Recapitulation*

Reference should be made to the preceding detailed description of various figures for a full understanding thereof. The general operation may, however, be recapitulated very briefly as follows:

The supply of targets is stacked in rows on the roller conveyor 83. As various targets become used up, successive rows of targets are gradually fed forwardly on the roller conveyor to the front row position, and then are fed leftwardly along the front row to the delivery position between the curved arms 121 and 123 which are mounted on the cam-operated arms 431 and 433.

Toward the end of each cycle of operation, the arms 121 and 123 are pulled together by the spring 435 to embrace the stack of targets in the delivery position, at the level of the next-to-the-bottom target, thereby supporting the stack of targets while the delivery table 297 swings downwardly on the pivot shaft 287 and the bottom target from the stack swings down with this delivery table and moves down the chute 301 onto the throwing arm 251, at a variable position on this throwing arm determined by the irregular cam 369 which swings the delivery chute 301 back and forth to a limited extent around the post 295, so that sometimes the target is laid closer to the outer end of the throwing arm 251, and sometimes farther from the outer end thereof. These variations in the position at which the target is placed on the throwing arm will cause a variation in the trajectory of the target. At the end of the cycle of operation, the delivery table 297 is restored to its upper horizontal position, the grasping arms 121 and 123 move slightly downwardly to deposit the stack of targets on the table, and then separate laterally from the stack and move backwardly to their normal elevation.

To initiate a target throwing cycle, the sportsman or his companion presses the button 565, thereby energizing the solenoid 235 to release the latch 217 so that, under the influence of the powerful and previously wound spring 205, the plate 201 and throwing arm 251 move rapidly around in a counterclockwise direction when viewed from above as in Figs. 2 and 9, thereby rolling the target along the guide rail 257 of the throwing arm and projecting the target outwardly by centrifugal force from the end of the throwing arm. The curved shape of the throwing arm is particularly gentle on targets and results in throwing them successfully without breakage, even if the target is quite delicate or has been cracked previous to reaching the throwing position. This satisfactory handling of cracked or chipped targets is probably due at least in part to the curved shape of the throwing arm, whereby the initial quick acceleration of the throwing arm when tripped or released, causes the target, if slightly spaced from the guide rail 257, to be pressed against the guide rail in an oblique or tangential direction, which is much gentler and less severe on the structure of the target than if the initial force bringing the target and the guide rail into contact with each other were exerted in a direction radial to the target.

The target leaves the end of the throwing arm at roughly half a revolution from the rest position. The rotation of the throwing arm is then snubbed by the snubber 271, and the arm is brought to rest in its normal rest position against the latch 217, whereupon the continued motion of the shaft 53 through a single revolution as determined by the single revolution clutch 51 serves to wind up the power spring 205 once more to its tight position, after which the clutch 51 disconnects and the spring is held in wound condition, ready for the next throw. During the last part of this cycle a new target is fed from the delivery plate 297 down the chute 301 into proper position on the throwing arm, ready for the next cycle.

The curved throwing arm is considerably more efficient and satisfactory than the straight throwing arms which have been incorporated in prior machines for throwing targets. When a target is placed on a straight radial arm, if the target happens to be spaced a slight distance away from the guide rail along the trailing edge of the arm it is apparent that the target will slam against the guide rail in a direction perpendicular thereto, when the arm suddenly begins to swing on its pivot at the commencement of a throwing operation. This sudden impact, in a direction perpendicular to the guide rail and radial to the target, is likely to chip or crack the target. Also, when thrown from a straight radial arm, the target travels along the guide rail for such a short distance that it frequently slips or skids along the rail and does not pick up sufficient roll or spin by the time it leaves the outer end of the throwing arm and guide rail, unless a rubber contact strip is used, and if a rubber strip is used, it has a tendency to wear quickly and somewhat irregularly, requiring relatively frequent replacement.

With the present curved arm construction, the results are much improved. In the region where the target is initially placed on the throwing arm, the arm and its guide rail extend almost in a circumferential direction rather than radially. The target is initially delivered to a gentle contact with the guide rail, so that when the arm suddenly starts its swing, the target is already in contact with the rail and will not normally hit against the rail at this time. If a considerable interval occurs between one throw and the next one, it is possible that vibration of the machine may separate the target somewhat from the guide rail. But even if this occurs, the initial impact between the target and the guide rail, at the beginning of the throw, will be a gentle impact in an oblique direction, with no substantial danger of chipping or cracking the target. The guide rail or contact strip, being of hard fiber, or of wood (a fibrous material), has sufficient friction to give the target a good spin, yet has very long wearing qualities, much superior to rubber, and at the same time has little tendency to crack or chip the target.

Because of the curved shape of the arm, the path of travel of the target along the arm is considerably longer than with a straight arm whose outer end swings on a circle of the same diameter. Therefore, the target remains in contact with the guide rail for a greater distance than would be the case with a straight arm, and has a better chance to roll rather than slide or skid along the guide rail, thus imparting the desirable spin or rotation to the target before it leaves the throwing arm.

Moreover, the target leaves the curved arm at a considerably greater velocity than would be the case with an equivalent straight arm. This is apparently due to the fact that it accelerates more rapidly during the initial part of the swing of the arm. With a straight radial arm, the only force tending to move the target outwardly along the arm is centrifugal force, which is initially rather small because of the small distance of the target from the center of rotation of the arm, and the inertia of the target tends to oppose, rather than to assist, the commencement of the outward movement of the target. With the curved arm of the present invention, there is not only the effect of centrifugal force tending to move the target outwardly, but the inertia of the target actually helps to start it rapidly along its curved path of travel, with high acceleration, rather than to impede it. Since the inertia of the target tends to keep it where it is, it follows that when the arm begins to swing leftwardly, the target, tending to remain stationary, will in effect move rightwardly along the arm, in the intended path of travel. Thus the inertia effect and the centrifugal force effect work with each other rather than against each other, resulting in a high rate of acceleration of the target and a high velocity of throw from the outer end of the throwing arm.

It will be noted from Fig. 9 that the curvature of the throwing arm 251 extends through an angle of more than 45 degrees but not more than 90 degrees. By this is meant that a tangent to the guide rail 257 at the inner end of the throwing arm would make an angle of not less than 45 nor more than 90 degrees with a tangent to the guide rail at the outer end of the throwing arm. These approximate limits are quite satisfactory in practical use, as a curvature between these limits enables the outer end of the arm to extend approximately (but not necessarily exactly) radially with respect to the shaft 53, while the inner end of the arm, on which the target is initially placed, extends approximately (but not necessarily exactly) circumferentially with respect to the shaft and has a circumferential portion of sufficient length to give the target a good start from the inertia effect, even before the centrifugal force effect begins to act. It is also found to give best results if the curvature of the throwing arm is continued substantially all the way to the outer end thereof, rather than having a curve only at the inner end followed by a straight portion of substantial length farther out.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A target throwing machine comprising a shaft, a target throwing arm mounted for rotation about the axis of said shaft as a center of rotation, means for rotating said arm through approximately one complete revolution at each throwing operation, means for holding said throwing arm stationary in a predetermined position between successive throwing rotations of said arm, a target delivery member movable upwardly and downwardly, means for delivering successive targets one by one to said delivery member, means for moving said delivery member downwardly toward said throwing arm while the latter is stationary to deliver an individual target from said delivery member to said throwing arm, and means including an irregular cam for shifting said delivery member to deliver successive targets to various different positions along the length of said throwing arm.

2. A target throwing machine comprising an upright shaft, a target throwing arm rotatable around the axis of said shaft as a center of rotation, means for rotating said arm through approximately one complete revolution at each throwing operation and for holding it in a predetermined stationary position between operations, a target delivery chute oscillatable about an upright second axis offset laterally from the axis of said shaft, said chute being in a position to transfer a target to said arm while said arm is stationary, means for holding an approximately vertical stack of targets, means for delivering individual targets successively one by one from the bottom of said stack to said chute so that said chute may transfer them to said throwing arm, and means for oscillating said chute about said second axis to vary the point on said throwing arm to which a target is transferred by said chute.

3. A target throwing machine comprising an upright shaft, a target throwing arm rotatable around the axis of said shaft as a center of rotation, means for rotating said arm through approximately one complete revolution at each throwing operation and for holding it in a predetermined stationary position between successive operations, a target delivery chute oscillatable about an upright second axis offset laterally from the axis of said shaft, said chute being in a position to transfer a target to said arm while said arm is stationary, means for holding a vertical stack of targets, means for delivering individual targets successively one by one from the bottom of a stack in a predetermined final position to said chute so that said chute may transfer them successively to said throwing arm, and means for oscillating said chute about said second axis to vary the point on said throwing arm to which a target is transferred by said chute.

4. A target throwing machine including a rotatable target throwing arm adapted to support a target placed thereon and to project said target outwardly by centrifugal force when the arm is rotated, a movable platform for supporting an upright stack of targets, a platform supporting bracket swingable upwardly and downwardly on an approximately horizontal axis to shift said platform from an upper approximately horizontal position to a lower inclined position, a chute supported from said bracket to swing upwardly and downwardly bodily therewith and also pivotally mounted for lateral swinging movement relative to said bracket and platform, said chute being so shaped that when said bracket is swung downwardly said chute is inclined downwardly and the lower end thereof overlies said throwing arm in position to guide a target from said platform to said throwing arm, and means for supporting all but the bottom one of a stack of targets on said platform, when said bracket and platform swing downwardly, so that only the bottom target of such stack will move downwardly with said platform and will move from said platform to said chute and from said chute to said throwing arm.

5. A target throwing machine including a rotatable target throwing arm adapted to support a target placed thereon and to project said target outwardly by centrifugal force when the arm is rotated, a movable platform for supporting an upright stack of targets, a platform supporting bracket swingable upwardly and downwardly on an approximately horizontal axis to shift said platform from an upper approximately horizontal position to a lower inclined position, a chute supported from said bracket to swing upwardly and downwardly bodily therewith and also pivotally mounted for lateral swinging movement relative to said bracket and platform, said chute being so shaped that when said bracket is swung downwardly said chute is inclined downwardly and the lower end thereof overlies said throwing arm in position to guide a target from said platform to said throwing arm, means for swinging said chute laterally relative to said bracket so as to deliver different targets to different positions on said throwing arm, and means for supporting all but the bottom one of a stack of targets on said platform, when said bracket and platform swing downwardly, so that only the bottom target of such stack will move downwardly with said platform and will move from said platform to said chute and from said chute to said throwing arm.

6. A target throwing machine including a rotatable target throwing arm adapted to support a target placed thereon and to project said target outwardly by centrifugal force when the arm is rotated, a movable platform for supporting an upright stack of targets, a platform supporting bracket swingable upwardly and downwardly on an approximately horizontal axis to shift said platform from an upper approximately horizontal position to a lower inclined position, a chute supported from said bracket to swing upwardly and downwardly bodily therewith and also pivotally mounted for lateral swinging movement relative to said bracket and platform, said chute being so shaped that when said bracket is swung downwardly said chute is inclined downwardly and the lower end thereof overlies said throwing arm in position to guide a target from said platform to said throwing arm, and a pair of supporting arms movable toward and away from each other on opposite sides of a stack of targets supported on said platform, to engage the next to the bottom target of such stack and support said next to the bottom target and all targets above it when said bracket and platform swing downwardly, so that only the bottom target of such stack will move downwardly with said platform and will move from said platform to said chute and from said chute to said throwing arm.

7. A target throwing machine including a motor, an upright shaft inclined at a slight angle to the vertical and having a lower part driven continuously by said motor and an upper part operatively connected to the lower part by a single revolution clutch so that the upper part of said shaft will be driven intermittently through only a single revolution each time that said clutch is tripped, a throwing arm mounting member rotatably mounted on the upper part of said shaft, a power spring surrounding the upper part of said shaft and operatively connecting said upper part of said shaft to said mounting member to tend to turn said mounting member on said shaft when the spring is wound, a latch for holding said mounting member in stationary position while the spring is being wound, means for releasing said latch and concomitantly tripping said single revolution clutch so that the wound spring will turn said mounting member through one revolution and the upper part of said shaft will be turned through one revolution to rewind the spring ready for the next operation, a throwing arm mounted on said mounting member for turning therewith and for upward and downward swinging adjustment relative to said mounting member, to vary the inclination at which a target is thrown from said throwing arm, means for holding an upright stack of targets in a delivery position, a plurality of control cams driven from the upper part of said shaft in timed relation to the intermittent rotations thereof, and means controlled at least in part by said cams for delivering to the throwing arm one target from the bottom of the stack in delivery position, while the throwing arm is at rest following a throwing operation, varying in an irregular manner the exact position on the throwing arm to which the target is delivered, so as to vary in an unpredictable manner the trajectory in which the target will be thrown at the next throwing position.

8. A target throwing machine comprising an upright shaft, a target throwing arm rotatable about the axis of said shaft as a center of rotation, said arm having an elongated target receiving and guiding surface part of which is curved in a longitudinal direction, said arm being mounted in such position relative to said shaft that said shaft lies on the convex side of said arm and the concave side of said arm is faced away from said shaft, means for rotating said arm about the axis of said shaft through approximately one complete throwing operation and for holding it in a predetermined stationary position between operations, a target delivery chute oscillatable about an upright second axis offset laterally from the axis of said shaft and lying on the concave side of said arm when said arm is in said predetermined stationary position, said chute when in effective delivery position being inclined downwardly from an upper target-receiving end to a lower target-delivering end overlying the curved part of said throwing arm, means for holding an approximately vertical stack of targets, means for delivering individual targets successively one by one from the bottom of said stack to the upper end of said chute so that they may slide down said chute to the lower end thereof and pass from the lower end of said chute onto said throwing arm, and means for oscillating said chute about said second axis to swing the lower end of said chute to various points along the curved part of said throwing arm to vary the point on said throwing arm at which a target is delivered by said chute.

9. A construction as defined in claim 8, in which said first mentioned axis and said second axis are in nonparallel relation to each other, and in which said chute is mounted for limited lateral tilting movement about a third axis approximately perpendicular to said second axis.

10. A construction as defined in claim 8, further including means forming a third axis extending approximately horizontally, and means supporting said second axis from said third axis for limited oscillating movement thereon.

References Cited in the file of this patent

UNITED STATES PATENTS

| | | |
|---|---|---|
| 624,044 | Jenkins | May 2, 1899 |
| 948,499 | Clow | Feb. 8, 1910 |
| 1,071,512 | Davey | Aug. 26, 1913 |
| 2,267,525 | Kemp | Dec. 23, 1941 |
| 2,430,077 | Razee | Nov. 4, 1947 |
| 2,469,016 | Stopper | May 3, 1949 |
| 2,504,437 | McEwen | Apr. 18, 1950 |
| 2,656,831 | Puth | Oct. 27, 1953 |